US012609386B2

(12) United States Patent
Stephan

(10) Patent No.: US 12,609,386 B2
(45) Date of Patent: Apr. 21, 2026

(54) MOBILE CHARGING STATION WITH REGENERATIVE BRAKING SYSTEM FOR ONBOARD BATTERY RECHARGING

(71) Applicant: Charles Stephan, Houston, TX (US)

(72) Inventor: Charles Stephan, Houston, TX (US)

( * ) Notice: Subject to any disclaimer, the term of this patent is extended or adjusted under 35 U.S.C. 154(b) by 949 days.

(21) Appl. No.: 17/668,729

(22) Filed: Feb. 10, 2022

(65) Prior Publication Data

US 2023/0253657 A1    Aug. 10, 2023

(51) Int. Cl.
| | |
|---|---|
| *H01M 10/46* | (2006.01) |
| *H01M 50/204* | (2021.01) |
| *H02J 7/00* | (2006.01) |
| *H02J 7/14* | (2006.01) |
| *H02J 7/34* | (2006.01) |

(52) U.S. Cl.
CPC ......... *H01M 50/204* (2021.01); *H02J 7/0042* (2013.01); *H02J 7/1423* (2013.01); *H02J 7/342* (2020.01); *H01M 2220/20* (2013.01)

(58) Field of Classification Search
CPC ........ H02J 7/342; H02J 7/0042; H02J 7/0013; H02J 7/01423
USPC .......................... 320/104, 109, 111, 114, 115
See application file for complete search history.

(56) References Cited

U.S. PATENT DOCUMENTS

| | | | |
|---|---|---|---|
| 6,636,014 | B1 | 10/2003 | Payne |
| 8,388,017 | B2 | 3/2013 | Alexander |

| | | | | |
|---|---|---|---|---|
| 11,114,873 | B2 | 9/2021 | Baldwin | |
| 2019/0372357 | A1* | 12/2019 | Byrne | .................... H02J 7/0045 |
| 2019/0393709 | A1* | 12/2019 | Haase | ......................... H02J 7/02 |
| 2020/0262305 | A1 | 8/2020 | Chakraborty | |
| 2021/0316625 | A1* | 10/2021 | Oetken | .................... B60L 53/30 |
| 2022/0344964 | A1* | 10/2022 | Duarte | .................... H02S 10/10 |

FOREIGN PATENT DOCUMENTS

KR        20170102255 A  *  9/2017

OTHER PUBLICATIONS

Machine translate of KR20170102255A (Sep. 8, 2017) (Year: 2017).*

* cited by examiner

*Primary Examiner* — Edward Tso
(74) *Attorney, Agent, or Firm* — Edison Law Group, LLC.

(57) ABSTRACT

A mobile charging station includes a charging platform, a plurality of wheels axially attached to the charging platform, a plurality of energy storage devices arranged on the platform, and one or more outlets electrically connected to one or more energy storage devices of the plurality of energy storage devices, each of the outlets is configured to provide power to a connectable device. The plurality of energy storage devices are capacitors and/or battery packs, and one or more charging cables electrically connected to the one or more outlets configured to provide power to the connectable device. A charging port configured to receive power that is output to recharge one or more of the plurality of battery packs. The mobile charging station may be arranged on a utility trailer or drive-powered vehicle.

18 Claims, 3 Drawing Sheets

100

101

105

120

Locking Toolbox

118

135

110

135

102

150

125

MOBILE CHARGING STATION WITH REGENERATIVE BRAKING SYSTEM FOR ONBOARD BATTERY RECHARGING

BACKGROUND

Technical Field

The present disclosure generally relates to clean energy, and more particularly, to a portable provider of non-combustible power.

Description of the Related Art

In an attempt to slow climate change, state and federal governments are increasing their efforts to discourage the burning of fossil fuels. Landscaping equipment is one area facing increased scrutiny by several states. One reason is that tractor mowers, lawn mowers, hedge trimmers, and chain saws, if equipped with a two stroke engine, burn a mixture of oil and gasoline that causes a relatively large amount of pollution. Although there is some landscaping equipment that uses four stroke engines, which do not burn as much oil as two stroke engines, such landscaping equipment still freely pollutes the air.

California has recently passed a law (effective in 2024) that bans from use all landscaping equipment having internal combustion engines. Other states are expected to follow California's lead in the future. Replacement equipment will primarily have an all-electric operation. There is a challenge to using such devices in open areas outdoors where there are not any electrical outlets. Thus, there is a need to provide power to such replacement equipment for operations, battery charging, etc.

SUMMARY

In one embodiment, a mobile charging station includes a charging platform; a plurality of wheels axially attached to the charging platform; a plurality of energy storage devices arranged on the platform; and one or more outlets electrically connected to one or more energy storage devices of the plurality of energy storage devices, each of the outlets is configured to provide power to a connectable device.

In an embodiment, the plurality of energy storage devices are capacitors.

In an embodiment, the plurality of energy storage devices comprise battery packs.

In an embodiment, one or more charging cables electrically connected to the one or more outlets configured to provide power to the connectable device.

In an embodiment, a charging port is configured to receive power that is output to recharge one or more of the plurality of battery packs.

In an embodiment, the charging port is configured to accept a level 1 and a level 2 charging at a Society of Automotive Engineers (SAE) J1772 compliant power station.

In an embodiment, a regenerative brake including a generator configured to generate a charge from a braking of the plurality of wheels, wherein an output of the generator is electrically connected to the charging port of the battery packs.

In an embodiment, the generator is a drive motor of the mobile charging station that configured for reverse operation during breaking.

In an embodiment, the regenerative brake includes a brake energy storage device having an input connected to an output of the generator, and an output of the brake energy storage device is connected to the charging port.

In an embodiment, a hitch is configured for towing the mobile charging station to locations for charging electronic equipment.

In an embodiment, the electronic equipment includes landscaping equipment and/or equipment designed for outdoor use that operates via batteries.

In an embodiment, the electronic equipment includes personal utility vehicles and/or power tools.

In an embodiment, the mobile charging station is an electric vehicle with a non-combustible engine.

In an embodiment, a rack of chargers is configured to receive and charge battery packs from electronic equipment.

In an embodiment, a locking vented toolbox having a plurality of plugs along lateral and rear sides of the mobile charging station is configured for charging one or more connectable device.

In one embodiment, a mobile charging station includes a utility trailer configured to transport electric equipment. A charging platform is arranged on a floor of the utility trailer. A plurality of energy storage devices is arranged on the platform. One or more outlets is electrically connected to one or more energy storage devices of the plurality of energy storage devices. Each of the outlets is configured to provide power to charge a battery pack of one or more connectable devices.

In an embodiment, at least some of the outlets are arranged along in an exterior of the utility trailer, and a remainder of the outlets are arranged in an interior of the utility trailer.

In an embodiment, the charging platform is configured to house and charge electric equipment in the utility trailer during transport, and the mobile charging station is configured to provide power to charge the one or more connectable device in an outdoor setting.

In an embodiment, the electric equipment includes landscaping equipment, and/or electric personal utility vehicles (PUV).

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or operations that are illustrated. When the same numeral appears in different drawings, it refers to the same or like components or operations.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high level, without detail, to avoid unnecessarily obscuring aspects of the present teachings.

The mobile charging station includes or can be attached to a platform (e.g. a base) that may be towed or self-propelled. While some embodiments discussed herein have wheels, the appended claims of the disclosure are not so limited. For example, that mobile charging station may have a platform without wheels that is transported by a pickup trip to a job site to charge electric equipment, including but not limited to landscaping equipment, power tools, etc.

The mobile charging station according to the present disclosure is configured to provide the charging of electric equipment throughout a day of operation. In an embodiment, the mobile charging station is outfitted with battery packs similar to the battery packs used in electric vehicles (EVs) to charge electric equipment. The mobile charging station is constructed to charge electric personal utility vehicles (PUVs) including but not limited in any way to golf carts, All Terrain Vehicles (ATVs), side-by-sides, etc.

In an embodiment, the mobile charging station is outfitted to charge equipment such as riding mowers, push mowers, weed whackers, blowers, edgers, and other equipment used in the manicuring of lawns. On a PUV side, the mobile charging station can support traveling to a destination and provide charging to vehicles such as when off-grid camping. In addition, the vehicle charging is also constructed to charge air compressors and battery powered tools that can be associated with off-grid camping.

Figure 1:
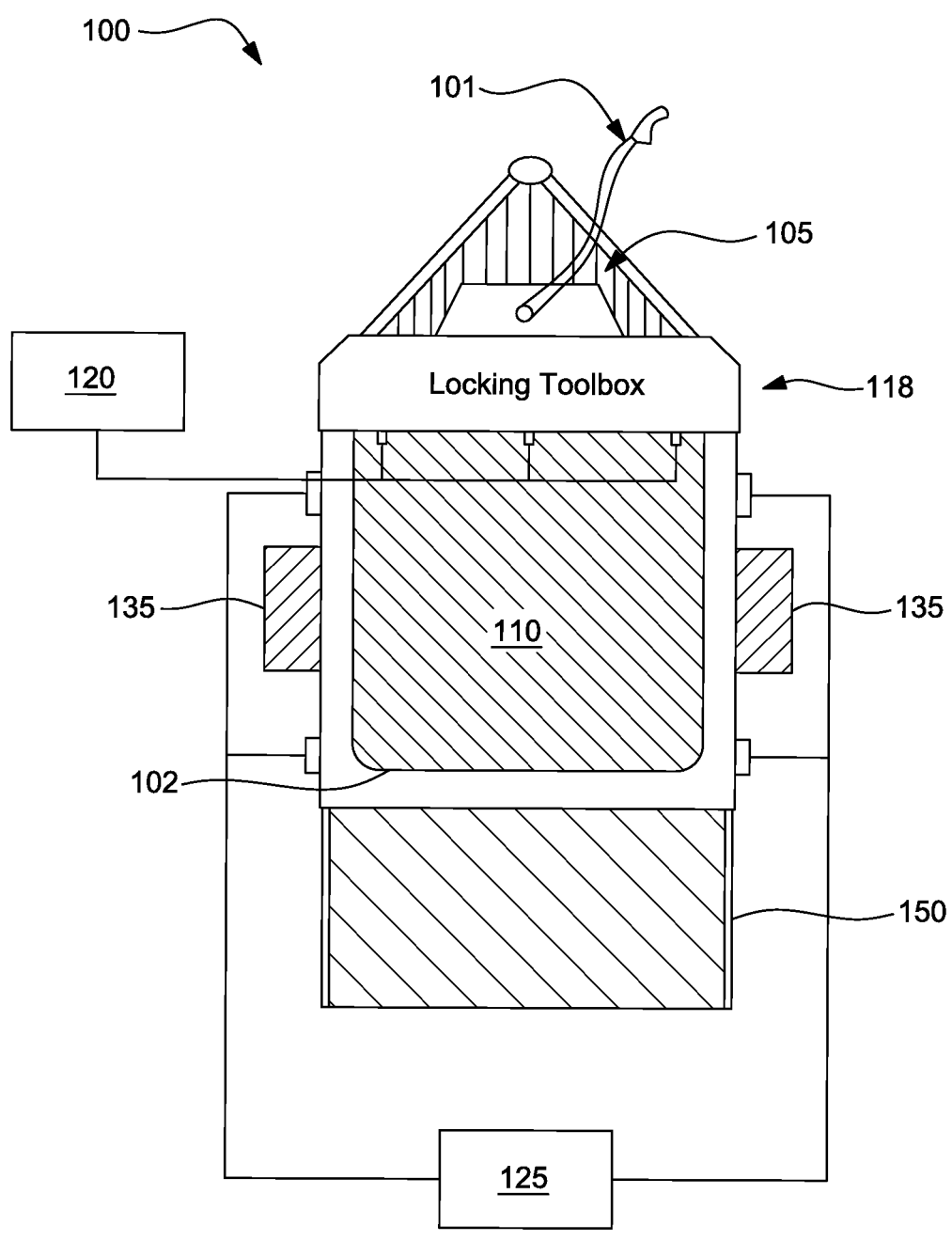
FIG. 1 illustrates a top cross-sectional view of a mobile charging station according to an embodiment of the present disclosure.

FIG. 1 illustrates a top cross-sectional view of a mobile charging station 100 according to an embodiment of the present disclosure. The mobile charging station shown in FIG. 1 may be embodied as a utility trailer 150 (see also, FIG. 2). However, it is to be understood by a person of ordinary skill in the art that the present disclosure is not limited to a utility trailer.

As shown in FIG. 1, a charging cable 101 is stored on a reel in a charging box 105 of a charging port. The charging port configured to receive power that is output to recharge one or more of the plurality of batteries 110.

The charging cable 101 can be used to charge the batteries of the mobile charging station at a power station. In an embodiment, the mobile station is configured for charging at a power station, such as a Society of Automotive Engineers (SAE) J1772 compliant Electrical Vehicle Supply Equipment (EVSE) station, and by accepting level 1 and level 2 charging. Other charging standards are within the spirit and scope of the disclosure and the appended claims.

Batteries 110 are stored in the floor of a platform 102, but it is to be understood that the batteries 110 may be stored in different areas of the mobile charging station to equalize the weight distribution. Different types of batteries 110 with different voltage and current values may be provided. The batteries 110 may be embodied as battery packs. Electrical equipment, including non-combustible electrical engine equipment, can drawer power from the battery packs when needed at a job site. In addition, when the equipment is on the mobile charging station while being transported to a job site, the battery packs can charge the electrical equipment.

With continued reference to FIG. 1, a locking toolbox 118 is shown. The toolbox 118 may be vented, and charging plugs/outlets may be stored inside the toolbox 118. A plurality of cable reels 120 are shown to plug into electrical equipment to provide a battery charge. A plurality of plugs/outlets 125 are arranged along the sides of the mobile charging station. While only four plugs/outlets 125 are shown, a plurality of plugs less than or greater than four may be provided. The plugs/outlets 125 may be provided at different areas than shown, including the back and the front of the mobile charging station. In addition, the plugs/outlets 125 may be arranged in an interior and an exterior of the utility trailer 150. The plugs/outlets arranged inside the trailer 150 can be used to charge equipment while it is being transported. For example, landscaping equipment, power tools, personal utility vehicles may be arranged in the utility trailer 150 and charged on the way to different job sites. Moreover, upon arriving at a location, devices on a jobsite, or just their battery packs, may be brought into the utility trailer 150 or adjacent the utility trailer for internal or external charging. Regenerative brakes 135 may be arranged in the wheels to generate power as the vehicle is slowed down or stopped. The charge generated can be used to charge supplement the charge receive at a power station via the charge port to help energize the battery packs 118.

Figure 2:
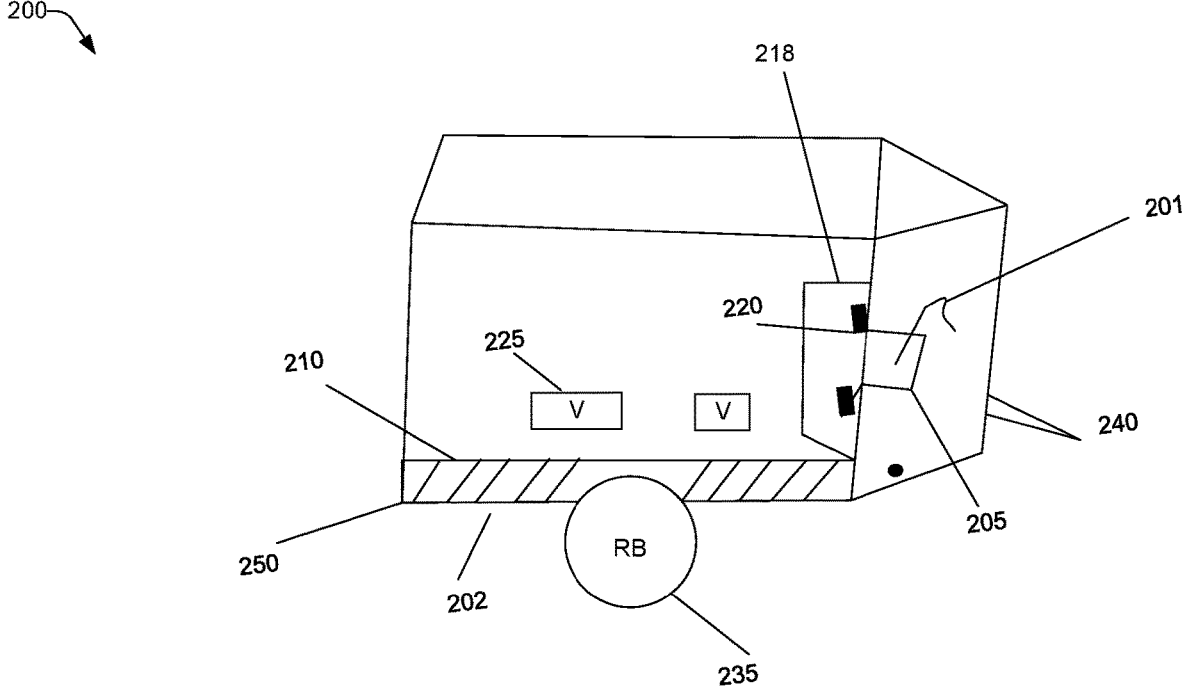
FIG. 2 illustrates a side view of a mobile charging station according to an embodiment of the present disclosure.

FIG. 2 illustrates a side view of a mobile charging station 200 according to an embodiment of the present disclosure. This side view of a utility trailer 250 houses the same elements including platform 202, batteries 210, a plurality of plugs 225, cable reels 220, locking toolbox 218, charging cable 201, charging box 205, and regenerative brakes 235 all operate as describe above with regard to FIG. 1. A towing hitch 240 is also shown. As previously disclosed, the mobile charging station can include a drive motor and steering for self-propulsion.

Figure 3:
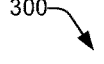
FIG. 3 is a schematic of some electronic components of the mobile charging station according to an embodiment of the present disclosure.
Figure 3:
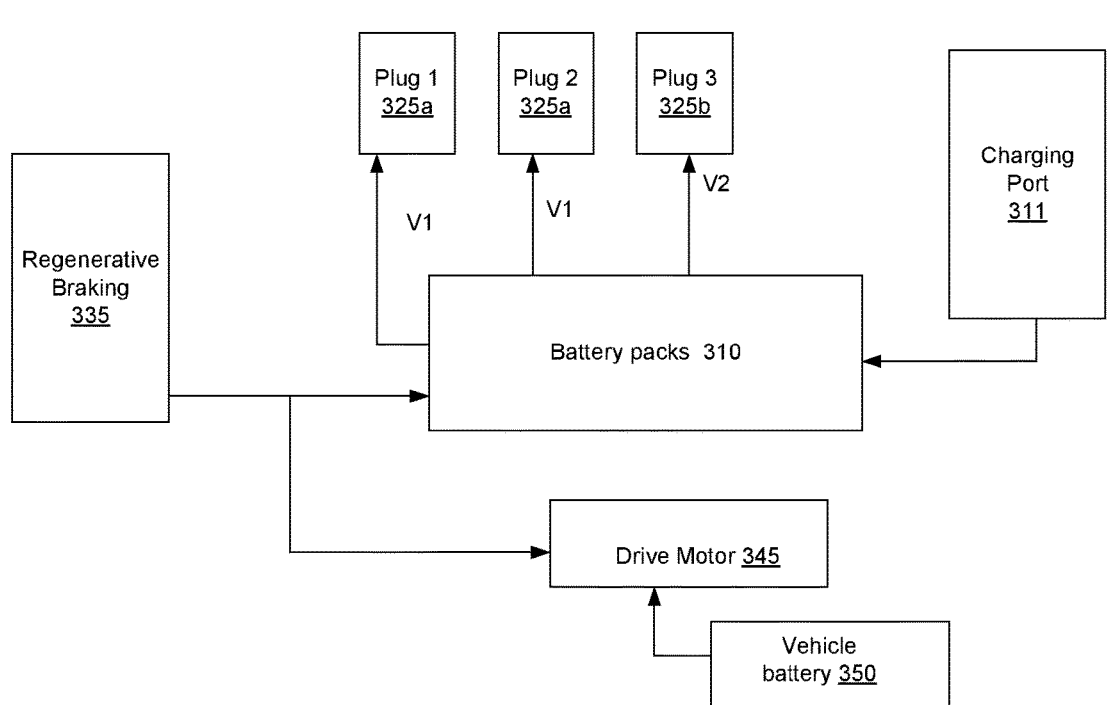

FIG. 3 is a schematic of some electronic components of the mobile charging station according to an embodiment of the present disclosure. The battery packs 310 can output different voltages (V1, V2) to the plugs 325$a$, 325$b$. There can be different types of plugs to accommodate various electric equipment in need of being recharged. A charging port 311 is the input where energy from a power station can be connected to reenergize the battery packs 310. Regenerative braking, which is optional, can assist in charging the battery packs. In the event that the mobile charging station is arranged on a self-propelled vehicle (rather than towed via a towing hitch or arranged on a flatbed of a truck), a drive motor 345 and a power source (vehicle battery) would be included. It is to be understood that steering and breaking mechanism, etc., would be included. The regenerative braking 335 may also assist by providing power to the drive motor 345 and/or the vehicle battery 350.

Conclusion

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The components, operations, steps, features, objects, benefits, and advantages that have been discussed herein are merely illustrative. None of them, nor the discussions relating to them, are intended to limit the scope of protection.

While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments of the disclosure are also contemplated. There are also embodiments of the disclosure in which the components and/or operations are arranged and/or ordered differently than described and shown herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A mobile charging station, comprising:
a charging platform;
a plurality of energy storage devices arranged on the platform; and
one or more outlets electrically connected to one or more energy storage devices of the plurality of energy storage devices, each of the outlets is configured to provide power to a connectable device;
a regenerative brake including a generator configured to generate a charge from a braking of the plurality of wheels, wherein an output of the generator is electrically connected to the charging port of the battery packs; and
wherein the generator comprises a drive motor of the mobile charging station configured for reverse operation.

2. The mobile charging station according to claim 1, further comprising:
a plurality of wheels axially attached to a bottom of the charging platform.

3. The mobile charging station according to claim 2, further comprising a hitch configured to tow the mobile charging station to locations for charging electronic equipment.

4. The mobile charging station according to claim 3, wherein the electronic equipment includes landscaping equipment and/or equipment designed for outdoor use that operates via batteries.

5. The mobile charging station according to claim 3, wherein the electronic equipment includes personal utility vehicles and/or power tools.

6. The mobile charging station according to claim 1, wherein the plurality of energy storage devices comprise capacitors.

7. The mobile charging station according to claim 1, wherein the plurality of energy storage devices comprise battery packs.

8. The mobile charging station according to claim 4, further comprising:
a charging port configured to receive power that is output to recharge one or more of a plurality of battery packs.

9. The mobile charging station according to claim 8, wherein the charging port is configured to accept a level 1 and a level 2 charging at a Society of Automotive Engineers (SAE) J1772 compliant power station.

10. The mobile charging station according to claim 7, wherein the mobile charging station comprises an electric vehicle having a non-combustible engine.

11. The mobile charging station according to claim 7, further comprising a charging box configured to receive and charge battery packs from electronic equipment.

12. The mobile charging station according to claim 7, further comprising a locking vented toolbox having a plurality of plugs along lateral and rear sides of the mobile charging station configured for charging one or more connectable devices.

13. The mobile charging station according to claim 1, further comprising:
one or more charging cables electrically connected to the one or more outlets configured to provide power to the connectable device.

14. The mobile charging station according to claim 1, wherein the regenerative brake includes a brake energy storage device having an input connected to an output of the generator, and
wherein an output of the brake energy storage device is connected to the charging port.

15. A mobile charging station, comprising:
a utility trailer configured to transport electric equipment;
a charging platform arranged on a floor of the utility trailer;
a plurality of energy storage devices arranged on the platform;
one or more outlets electrically connected to one or more energy storage devices of the plurality of energy storage devices, each of the outlets is configured to provide power to charge a battery pack of one or more connectable devices;
a regenerative brake including a generator configured to generate a charge from a braking of the plurality of wheels, wherein an output of the generator is electrically connected to the charging port of the battery packs;
wherein the regenerative brake includes a brake energy storage device having an input connected to an output of the generator, and
wherein an output of the brake energy storage device is connected to the charging port.

16. The mobile charging station according to claim 15, wherein at least some of the outlets are arranged along in an exterior of the utility trailer, and a remainder of the outlets are arranged in an interior of the utility trailer.

17. The mobile charging station according to claim 16, wherein the charging platform is configured to house and charge electric equipment in the utility trailer during transport, and the mobile charging station is configured to provide power to charge the one or more connectable device in an outdoor setting.

18. The mobile charging station according to claim 17, wherein the electric equipment comprises landscaping equipment, and/or electric personal utility vehicles (PUV).

\* \* \* \* \*